US011250211B2

(12) United States Patent
Virmani et al.

(10) Patent No.: US 11,250,211 B2
(45) Date of Patent: Feb. 15, 2022

(54) GENERATING A VERSION ASSOCIATED WITH A SECTION IN A DOCUMENT

(71) Applicant: HCL Technologies Limited, Uttar Pradesh (IN)

(72) Inventors: Manish Virmani, Noida (IN); Sumeet Kohli, Noida (IN)

(73) Assignee: HCL Technologies Limited, Noida (IN)

( * ) Notice: Subject to any disclaimer, the term of this patent is extended or adjusted under 35 U.S.C. 154(b) by 52 days.

(21) Appl. No.: 16/543,382

(22) Filed: Aug. 16, 2019

(65) Prior Publication Data
US 2021/0049235 A1 Feb. 18, 2021

(51) Int. Cl.
G06F 16/22 (2019.01)
G06F 16/245 (2019.01)
G06F 16/93 (2019.01)
G06F 16/38 (2019.01)
G06F 40/197 (2020.01)

(52) U.S. Cl.
CPC ........ G06F 40/197 (2020.01); G06F 16/2246 (2019.01); G06F 16/245 (2019.01); G06F 16/38 (2019.01); G06F 16/93 (2019.01)

(58) Field of Classification Search
CPC ............... G06F 16/1873; G06F 16/219; G06F 16/2246; G06F 16/245; G06F 16/30; G06F 16/31; G06F 16/322; G06F 16/33; G06F 16/38; G06F 16/93; G06F 40/166; G06F 40/197
See application file for complete search history.

(56) References Cited

U.S. PATENT DOCUMENTS

| | | | |
|---|---|---|---|
| 5,553,216 A | 9/1996 | Yoshioka et al. | |
| 5,574,898 A * | 11/1996 | Leblang | G06F 11/3476 |
| 6,061,697 A | 5/2000 | Nakao | |
| 6,880,124 B1 * | 4/2005 | Moore | G06F 16/955 |
| | | | 715/210 |
| 7,840,564 B2 | 11/2010 | Holzgrafe et al. | |
| 7,991,790 B2 | 8/2011 | Barker et al. | |
| 8,554,800 B2 | 10/2013 | Goldentouch | |
| 8,631,318 B2 | 1/2014 | Jeon et al. | |
| 9,003,365 B1 * | 4/2015 | Vogelheim | G06F 8/71 |
| | | | 717/122 |
| 9,448,986 B2 | 9/2016 | Vion-Dury | |
| 10,242,320 B1 * | 3/2019 | Elkholy | G06N 7/005 |
| 2008/0104141 A1 * | 5/2008 | McMahon | G06F 40/197 |
| 2012/0290926 A1 * | 11/2012 | Kapadia | G06F 40/166 |
| | | | 715/255 |
| 2013/0262420 A1 * | 10/2013 | Edelstein | G06F 40/197 |
| | | | 707/695 |

(Continued)

*Primary Examiner* — James E Richardson
(74) *Attorney, Agent, or Firm* — Kendal Sheets

(57) ABSTRACT

The present disclosure relates to system(s) and method(s) for generating a version associated with a section in a document. The system receives user inputs corresponding to line boundaries associated with the document. Based on the user inputs, the system generates a set of sections and a set of section tags associated with the set of sections. The system further generates one or more versions associated with each section tag when the section associated with the section tag is modified. Upon generation of the one or more versions, the system may store the one or more versions independent of the document.

12 Claims, 7 Drawing Sheets

(56) References Cited

U.S. PATENT DOCUMENTS

| | | | |
|---|---|---|---|
| 2014/0007068 A1* | 1/2014 | Cullen | G06F 16/11 |
| | | | 717/169 |
| 2016/0259769 A1* | 9/2016 | Siwoff | G06F 3/04842 |
| 2016/0381139 A1* | 12/2016 | Mullins | H04L 67/327 |
| | | | 709/217 |
| 2018/0107635 A1* | 4/2018 | Chen | G06F 16/93 |
| 2020/0272788 A1* | 8/2020 | Sanderson | G06K 9/00463 |

* cited by examiner

US 11,250,211 B2

GENERATING A VERSION ASSOCIATED WITH A SECTION IN A DOCUMENT

TECHNICAL FIELD

The present disclosure in general relates to the field of versioning a section of a document. More particularly, the present invention relates to a system and method for generating a version for a section of a document.

BACKGROUND

Generally, a document comprises huge amount of data and gets modified n daily basis. Once the documents are modified, different versions of the document are generated. In order to check the modifications, entire history of the documents and all the versions need to be scanned. In this case, the lengthier the revision history of the document, higher will be the number of iterations required to determine the version in which the modifications were made. Hence, it requires lot of time and efforts to determine an exact version in which the modifications are done in the document.

SUMMARY

Before the present systems and methods for generating a version for a section of a document, is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for generating the version for the section of the document. This summary is not intended to identify essential features of the claimed subject matter nor is it intended for use in determining or limiting the scope of the claimed subject matter.

In one implementation, a method for generating a version for a section in a document is illustrated. In one embodiment, the method may comprise generating a set of sections associated with a document, and a set of section tags associated with the set of sections. The set of sections and the set of section tags may be generated based on user inputs comprising line boundaries in the document. Further, the method may comprise generating one or more versions associated with each section tag, when a section, from the set of sections, associated with the section tag is modified. The one or more versions may be generated using a configuration management system. The method may further comprise storing the one or more versions associated with each section tag independently of the document in the configuration management system.

In one implementation, a system for generating a version for a section in a document is illustrated. The system comprises a memory and a processor coupled to the memory, further the processor is configured to execute instructions stored in the memory. In one embodiment, the processor may execute programmed instructions stored in the memory for generating a set of sections associated with a document, and a set of section tags associated with the set of sections. The set of sections and the set of section tags may be generated based on user inputs comprising line boundaries in the document. Further, the processor is configured to execute instructions stored in the memory for generating one or more versions associated with each section tag, when a section, from the set of sections, associated with the section tag is modified. The one or more versions may be generated using a configuration management system. The processor may further execute instructions stored in the memory for storing the one or more versions associated with each section tag independently of the document in the configuration management system.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

FIG. 6 B illustrates an exemplary embodiment for generation a version associated with the section in the document, in accordance with an embodiment of the present subject matter.

FIG. 6 C illustrates an exemplary embodiment for dynamic document version construction, in accordance with an embodiment of the present subject matter.

DETAILED DESCRIPTION

Some embodiments of the present disclosure, illustrating all its features, will now be discussed in detail. The words "comprising", "consisting", "including", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for generating a version for a section in a document are now described. The disclosed embodiments of the system and method for generating the version for the section in the document are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for generating a version associated with a section in a document is not intended to be limited to the embodiments illustrated, but is to be accorded the widest scope consistent with the principles and features described herein.

The present subject matter relates to generating a version associated with a section in a document. In one embodiment, data associated with line number in the document may be received from a user. Upon receiving the data, a section and a section tag associated with the section may be generated. Further, a version associated with the section tag may be generated, when the section is modified. The version associated with the section tag may be stored in a repository independent from the document.

Figure 1:
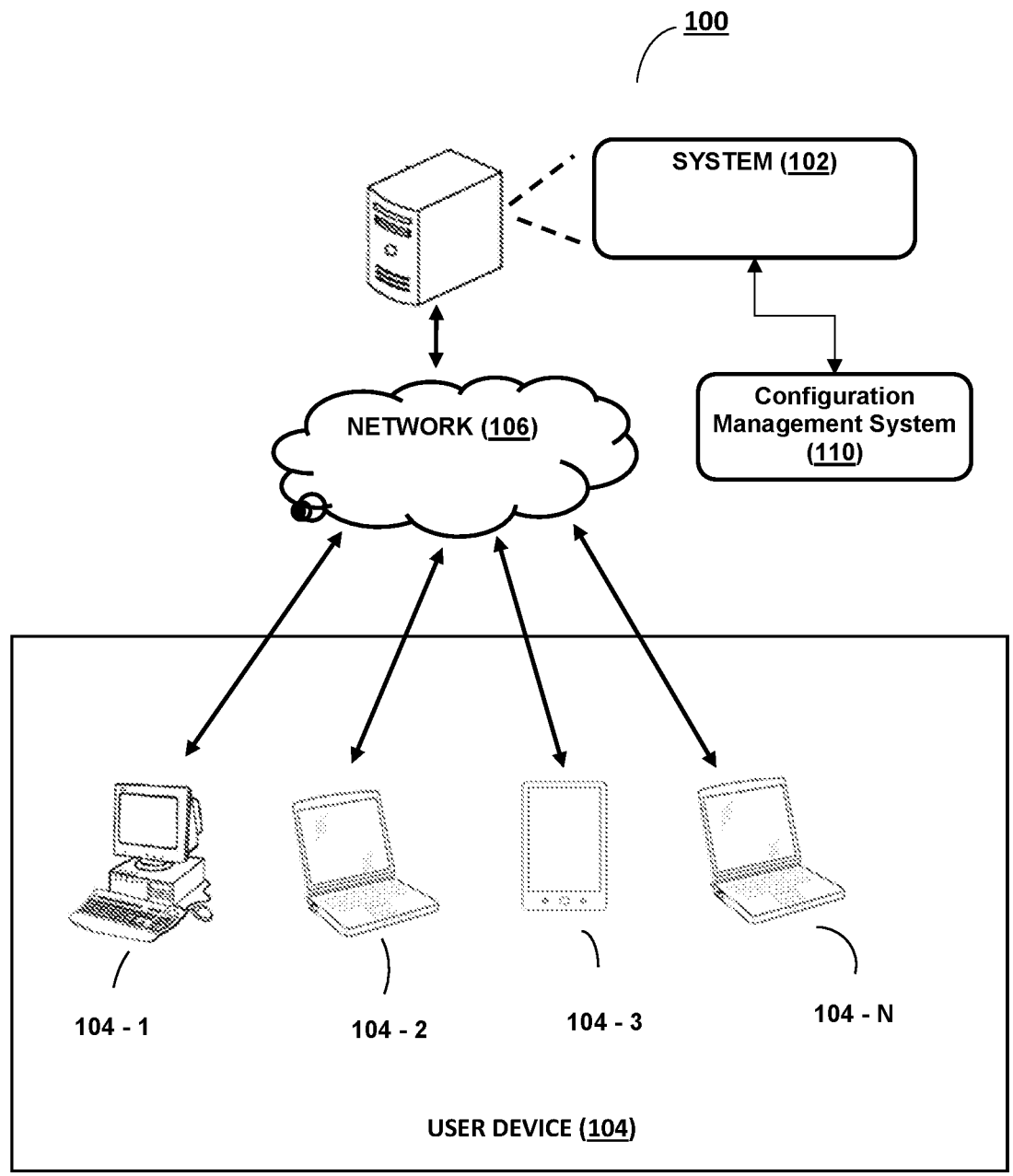
FIG. 1 illustrates a network implementation of a system for generating a version associated with a section in a document, in accordance with an embodiment of the present subject matter.

Referring now to FIG. 1, a network implementation 100 of a system 102 for generating a version associated with a section in a document is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Further, the system 102 may be connected to a configuration management system 110. In one aspect, the system 102 may store information to the configuration management system 110. In another aspect, the system 102 may retrieve any information from the configuration management system 110. The configuration management system may be configured to perform analysis on the information stored in the configuration management system.

In one embodiment, the system 102 may receive user inputs from a user. The user inputs may correspond to a line boundaries associated with a document. Upon receiving the user inputs, the system 102 may generate a set of sections and a set of section tags associated with the set of sections.

Further, the system 102 may generate one or more versions associated with each section tag. The one or more sections may be generated based on modification in a section associated with the section tag. The one or more versions may be generated using the configuration management system. Once the one or more versions are generated, the system 102 may store the one or more versions independent of the document in the configuration management system.

Figure 2:
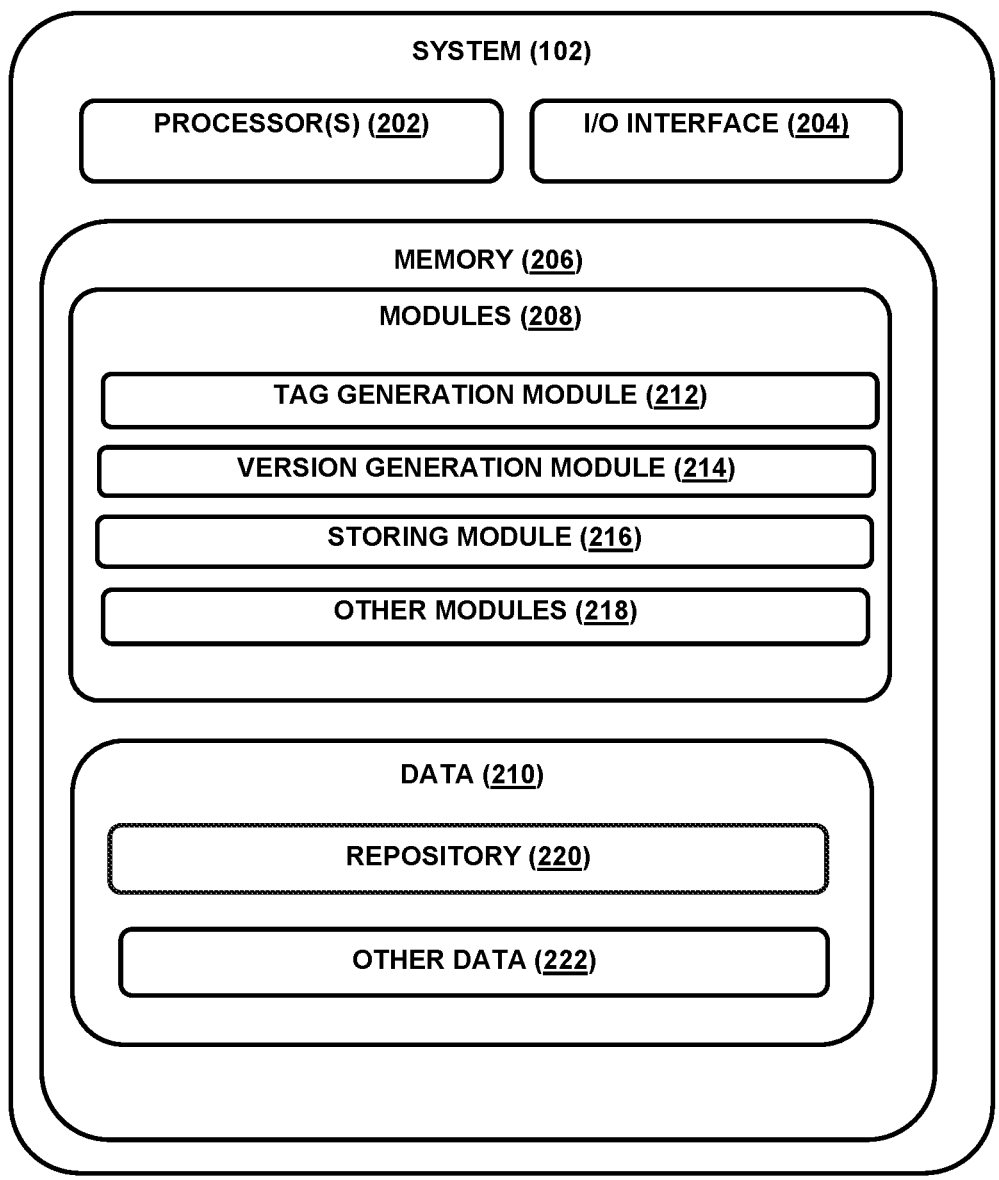
FIG. 2 illustrates the system for generating the version associated with the section in the document, in accordance with an embodiment of the present subject matter.

Referring now to FIG. 2, the system 102 for generating a version associated with a section in a document is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include a tag generation module 212, a version generation module 214, a storing module 216, and other modules 218. The other modules 218 may include programs or coded instructions that supplement applications and functions of the system 102.

The data 210, amongst other things, serve as a repository for storing data processed, received, and generated by one or more of the modules 208. The data 210 may also include a repository 220, and other data 222. In one embodiment, the other data 222 may include data generated as a result of the execution of one or more modules in the other modules 218.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the tag generation module 212 may be configured to receive a document. The document may comprise information, line numbers, page numbers and the like. Further, the tag generation module 212 may receive user inputs from a user. The user inputs may correspond to line boundaries associated with the document. The line boundaries may indicate a range of line numbers in the document. Once the range of line numbers is received, the tag generation module 212 may generate a set of sections associated with the range of line numbers. Each section, from the set of sections, may be associated with different ranges of line numbers in the document. In other words, the document may be divided into the set of sections based on the line boundaries.

Once the set of sections are generated, the tag generation module 212 may generate a set of section tags associated with the set of sections. Each section tag, from the set of section tags, may be unique. In one aspect, each section may be identified based on a section tag associated with that section. Each section tag may be referred as a name of the section. In one embodiment, a label may be generated for each section tag independent of the document label.

Upon generation of the set of section tags, the version generation module 214 may generate one or more versions associated with each section tag, from the set of section tags. In one embodiment, the user may modify a section in the document. Once the section is modified, the version generation module 214 may generate the one or more versions associated with the section tag of the section. The one or more versions may be generated using a configuration management system 110. In this case, each time when the section is modified, new version associated with that section may be generated.

Further, one or more version IDs may be generated for the one or more versions. Each version ID may be unique and may be used to identify the version associated with the version ID. In one embodiment, the version generation module 214 may generate a document version based on the one or more version associated with section tag of the section in the document. In other words, once the version associated with the section is generated, the document version associated with the document may also get generated.

Once the one or more versions are generated, the storing module 216 may store the one or more versions in the configuration management system. The one or more versions may be store independent of the storage of the document. The one or more versions may be stored in the configuration management system. It may help to easily extract the one or more version from the configuration management system using the section tag. In one embodiment, a request may be received from the user. The request may be for a target version, from the one or more versions, of at least one section tag. Based on the request, the target version of the section tag may be generated. The target version may be extracted based on the configuration management technique. The target version of the section may be extracted automatically upon receiving a version request from the user.

In one embodiment, a tree associated with the section tag may be generated. The tree may be generated based on the one or more version associated with the section tag. In one aspect, a difference between different versions associated with the section tag may be determined. The difference may be determined based on the comparison of the different versions associated with the section tag.

In one embodiment, a query may be received from the user. The query may comprise a requested document version, and a requested version of the section tag. Upon receiving the query, the requested version of the section tag may be pulled from the configuration management system. Further, content from the requested version of the section tag may be merged into the required document version. Based on the merging, a new document version may be constructed dynamically on the fly.

Exemplary embodiments discussed above may provide certain advantages. Though not required to practice aspects of the disclosure, these advantages may include those provided by the following features.

Some embodiments of the system and the method is configured to generate multiple version of a section in a document.

Some embodiments of the system and the method is configured to store the multiple versions of the section independent of the document.

Some embodiments of the system and method is configured to construction different version of document based on merging content in the section in the document.

Figure 3:
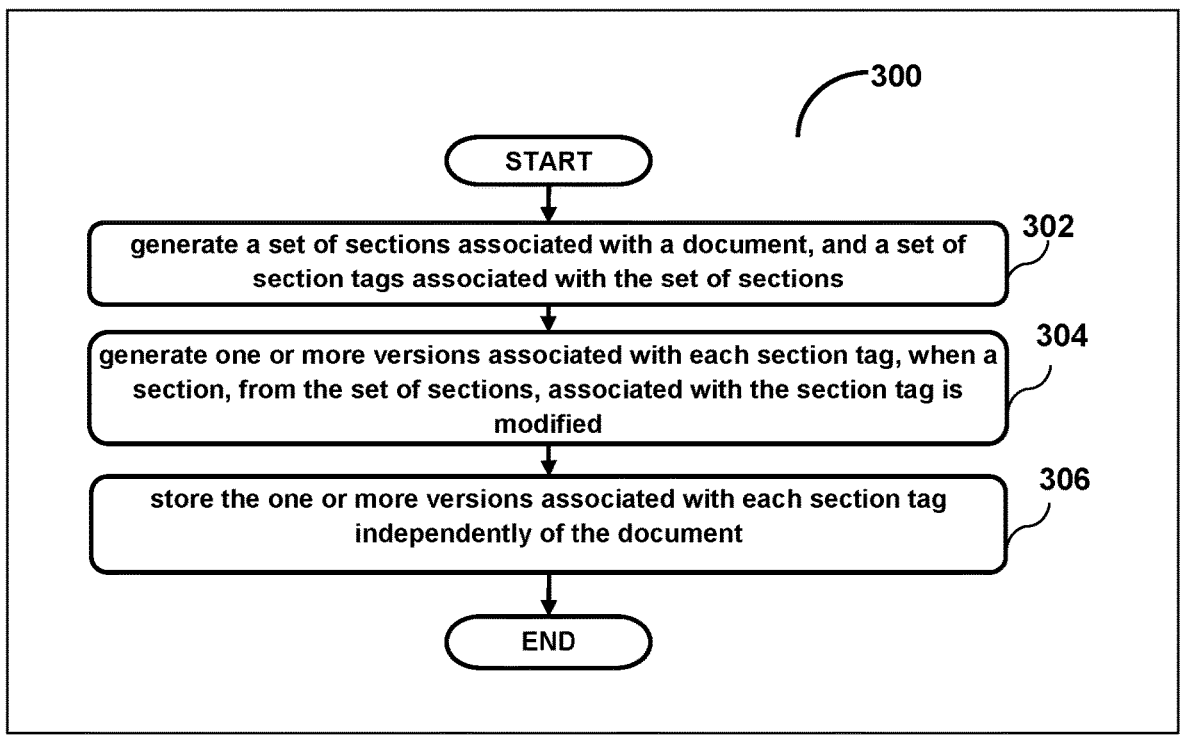
FIG. 3 illustrates a method for generating a version associated with a section in a document, in accordance with an embodiment of the present subject matter.

Referring now to FIG. 3, a method 300 for generating a version associated a section in a document, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, a set of sections and a set of section tags associated with the set of sections may be generated. In one implementation, the tag generation module 212 may be configured to generate the set of sections and the set of section tags. The set of sections and the set of section tags may be generated based on user inputs comprising line boundaries in the document.

At block 304, one or more versions associated with each section tag may be generated. In one implementation, the version generation module 214 may generate the one or more versions associated with each section tag. The one or more versions may be generated, when a section, from the set of sections, associated with the section tag is modified. The one or more versions may be generated using a configuration management system.

At block 306, the one or more version associated with each section tab may be stored in the configuration management system. In one implementation, the storing module 216 may store the one or more versions in the configuration management system. The one or more versions may be stored independently of the document.

Figure 4:
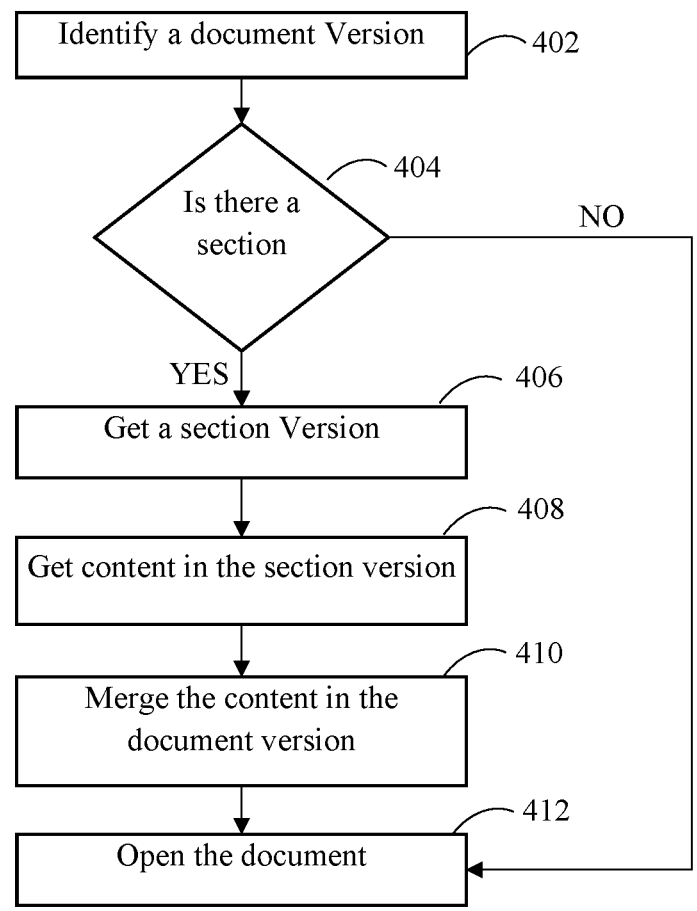
FIG. 4 illustrates a method for constructing a new document version, in accordance with an embodiment of the present subject matter.

Referring now to FIG. 4, a method for constructing a new document version, is disclosed in accordance with an embodiment of the present subject matter. The order in which the method is described is not intended to be construed as a limitation, and any number of the described method blocks can be combined in any order to implement the method or alternate methods. However, for ease of explanation, in the embodiments described below, the method may be considered to be implemented in the above described system 102.

In one embodiment, at block 402, a query may be received from a user. The query may comprise a requested document version. Upon receiving the query, the requested document version may be identified. At block 404, the system 102 may check if the query comprises a requested version of the section tag. In one embodiment, if the query does not comprise the requested version of the section tag, the system 102 may open the requested document version at block 412. In another embodiment, if the query comprises the requested version of the section tag, the system 102 may obtain the requested version of the section tag. The requested version of the section tag may be obtained from a configuration management system. Once the requested version of the section tag is obtained, at block 408, the system 102 may collect content in the section associated with the requested version of the section tag. Further, at block 410, the content may be merged into the requested document version. Upon morning, the system 102 may generate a new document version. Further, at block 412, the system 102 may open the new document version comprising the requested document version and the content in the section associated with the requested section tag. In one aspect, the new document version may be stored in the configuration management system. In another aspect, the new document version may not be stored in the configuration management system.

Figure 5:
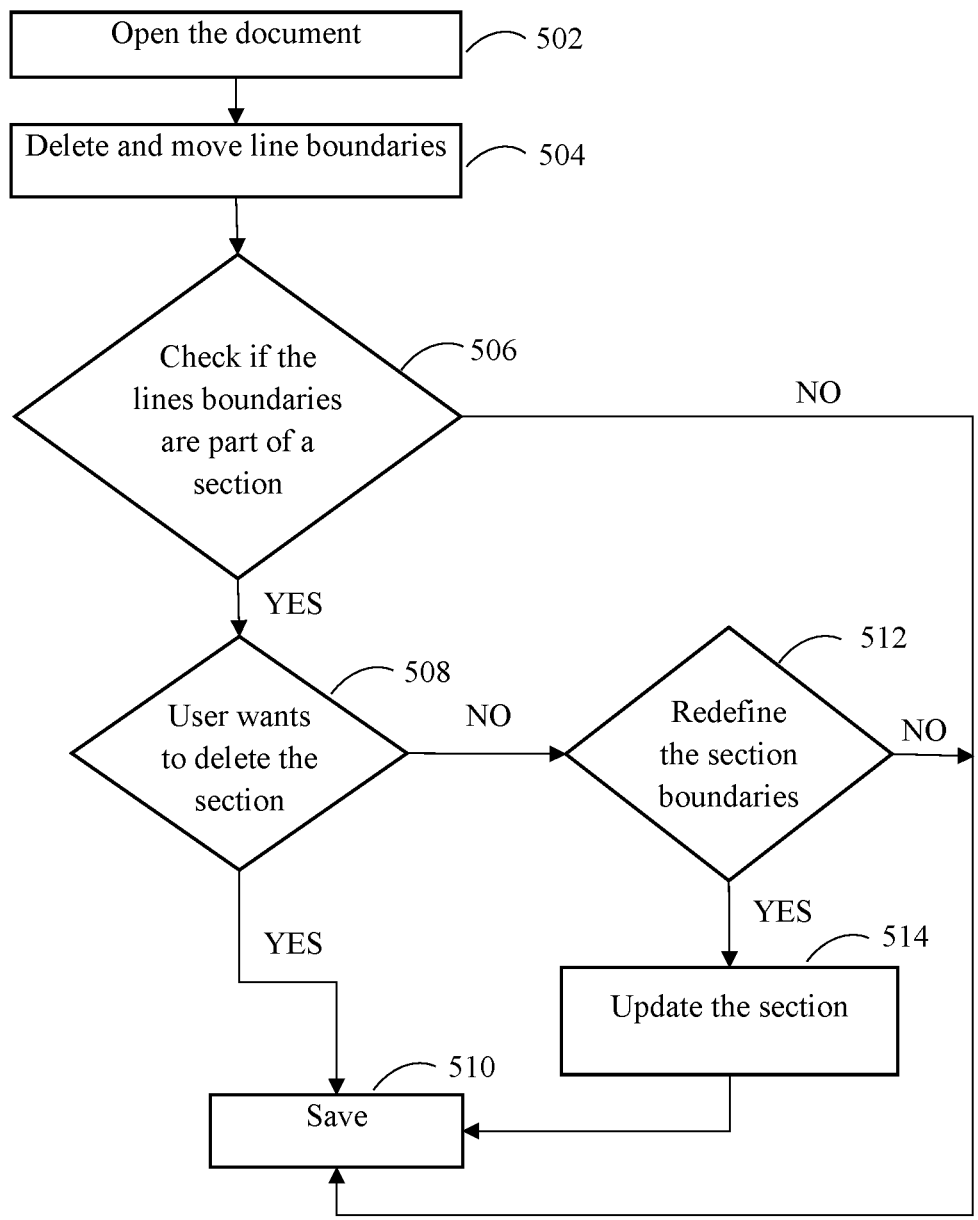
FIG. 5 illustrates a method for modifying section boundaries, in accordance with an embodiment of the present subject matter.

Referring now to FIG. 5, a method for modifying section boundaries, is disclosed in accordance with an embodiment of the present subject matter. The order in which the method is described is not intended to be construed as a limitation, and any number of the described method blocks can be combined in any order to implement the method or alternate methods. However, for ease of explanation, in the embodiments described below, the method may be considered to be implemented in the above described system 102.

At block 502, a document may be received and opened. The document may comprise information in a set of lines. At block 504, an instructions regarding deleting or moving line boundaries, associated with the set of lines, may be received. At block 506, the system 102 may check if the line boundaries are associated with a section based on an analysis of the section. In one embodiment, if the line boundaries are associated with the section, thee system 102 may delete the line boundaries from the section at block 508. Further, at block 510, the system 102 may save the section upon deleting the line boundaries.

In other words, the system 102 may check if the line boundaries are the part of the section. If the line boundaries are the part of the section and the instructions received corresponds to delete the line boundaries, then the system 102 may delete the line boundaries form the section.

In another embodiment, if the line boundaries are not associated with the section, then the system 102 may save the section, at block 510.

Further, at block 508, the user may not want to delete the line boundaries. At block 512, the system 102 may redefine the line boundaries associated with the section based on the instructions. Upon redefining the line boundaries, at block 514, the section may be updated. Further, the section may be saved at block 510. In other words, the system 102 may check if the instructions correspond to moving the line boundaries in the section. Further, the system 102 may redefine the line boundaries in the section based on the instructions and update the section.

Figure 6:
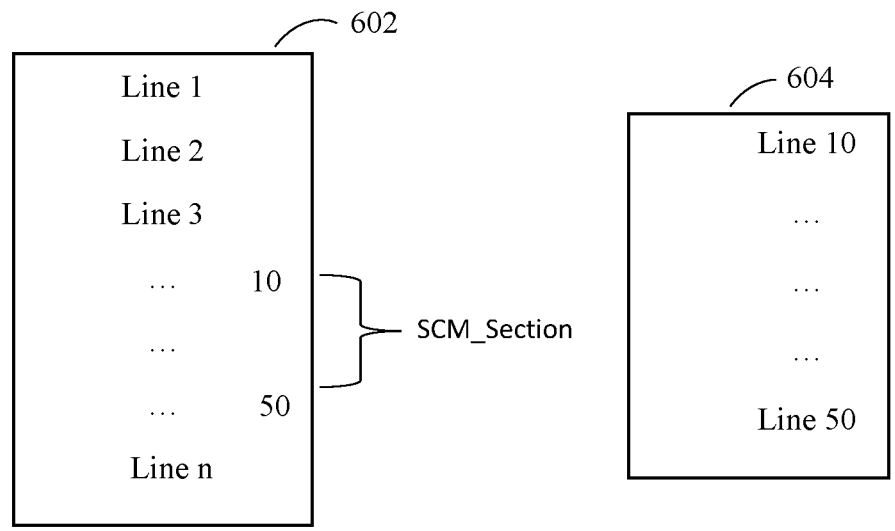
FIG. 6 A illustrates an exemplary embodiment for generation of a section in a document, in accordance with an embodiment of the present subject matter.
Figure 6:
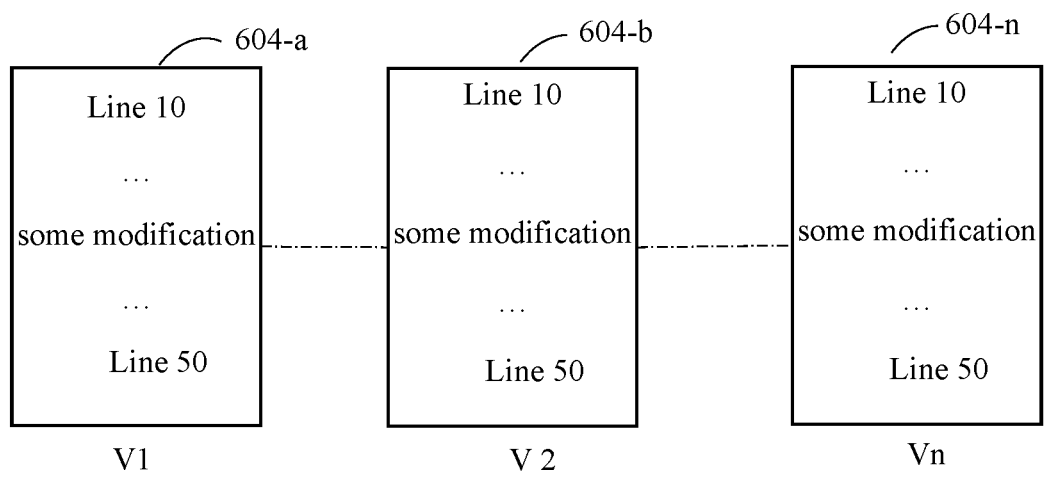
Figure 6:
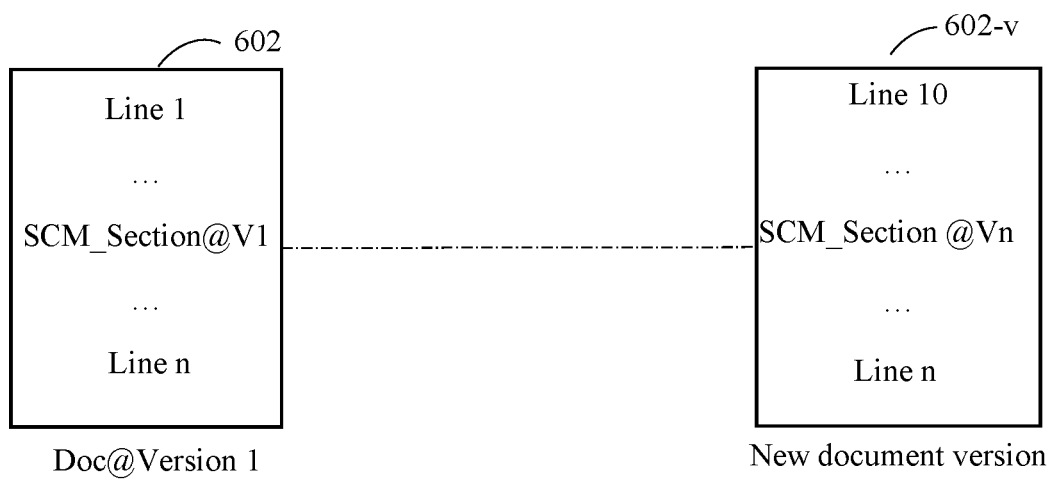

Referring now to FIG. 6 A, an exemplary embodiment for generation of a section in a document is illustrated in accordance with an embodiment of the present subject matter. Referring now to FIG. 6 B illustrates, an exemplary embodiment for generation a version associated with the section in the document is illustrated in accordance with an embodiment of the present subject matter. Referring now to FIG. 6 C, an exemplary embodiment for dynamic document version construction is illustrated in accordance with an embodiment of the present subject matter. In one embodiment, FIG. 6A, FIG. 6B and FIG. 6C are explained together.

In one embodiment, a document 602 may be obtained. The document 602 may comprise data in a set of lines from line 1 to line n. Further, user inputs comprise line boundaries from line 10 to line 50 may be received. Upon receiving the user inputs, a section 604 may be generated. The section may be referred as SCM_Section. Further, a section tag associated with the section may be generated. The section tag may be referred as SCM_Section_tag.

Further, a user may make some modifications in the section 604. If the modification is done in the section 604, then the version associated with the section 604 may be generated. In one aspect, if the section 604 is modified multiple times, then each time new version for the section 604 may be generated. In one example, construe that the section 604 is modified n times. In this case, n versions of the section 604 may be generated. The n versions of the section 604 may be indicated as V1 604-*a*, V2 604-*b*, . . . , Vn 604-*n*. The n versions of the section 604 may be stored in a configuration management system. In one aspect, the particular version of the section may be extracted from the configuration management system without revision of history of the section.

Furthermore, the document 602 may be stored as Doc@Version 1. The SCM_Section@V1 may be the part of the document 602. In one aspect, a query may be received from the user for SCM_Section@Vn in the document 602. In this case, the version SCM_Section@Vn is pulled and merged with the document 602. Based on merging the section version with the document, a new document version 602-*v* may be generated.

Although implementations for systems and methods for generating a version associated with a section in a document have been described, it is to be understood that the appended claims are not necessarily limited to the specific features or methods described. Rather, the specific features and methods are disclosed as examples of implementations for providing generating the version associated with the section in the document.

The invention claimed is:

1. A method for generating a version associated with a section in a document, the method comprising:
    generating, by a processor, a set of sections associated with a document, and a set of section tags associated with the set of sections, wherein:
        the set of sections and the set of section tags are generated based on user inputs comprising line boundaries in the document,
        the set of sections and the set of section tags are modified with a change in the line boundaries received in the user input, and
        the line boundaries comprise a range of line numbers in the document;

generating, by the processor, a first version associated with each section tag, when a section, from the set of sections, associated with the section tag is modified, wherein the the first version is generated using a configuration management system, and wherein a label for each section tag is generated independent of a document label;

modifying, by the processor, the first version to create a version, different from the first version, whenever the section, from the set of sections, associated with the section tag is modified;

storing, by the processor, the first and the modified versions associated with each section tag independently of the document in the configuration management system;

receiving a query from a user, wherein the query comprises a requested document version, and a requested version of the section tag; and constructing a new document version dynamically on the fly, wherein the new document version is constructed based on merging content of the section tag into the requested document version.

2. The method as claimed in claim 1, further comprises generating one or more version IDs associated with the first and modified versions of each section tag.

3. The method as claimed in claim 1, further comprises generating a document version associated with the document based on the first and modified versions associated with each section tag in the document.

4. The method as claimed in claim 1, further comprises extracting a target version, from the first and the modified versions, of each section tag based on a request received from a user, wherein the target version is extracted based on a configuration management technique.

5. The method as claimed in claim 1, further comprises generating a tree for the section tag based on the first version and the modified version associated with the section tag.

6. The method as claimed in claim 1, further comprises determining a difference between different versions associated with the section tag independent of the document.

7. A system for generating a version associated with a section in a document, the system comprising:
a memory; and
a processor coupled to the memory, wherein the processor is configured to execute instructions stored in the memory to:
generate a set of sections associated with a document, and a set of section tags associated with the set of sections, wherein:
the set of sections and the set of section tags are generated based on user inputs comprising line boundaries in the document, and wherein:
the set of sections and the set of section tags are modified with a change in the line boundaries received in the user input, and
the line boundaries comprise a range of line numbers in the document;
generate a first version associated with each section tag, when a section, from the set of sections, associated with the section tag is modified, wherein the first version is generated using a configuration management system, and wherein a label for each section tag is generated independent of a document label;
modify the first version to create a version, different from the first version, whenever the section, from the set of sections, associated with the section tag is modified;
store the first and modified versions associated with each section tag independently of the document in the configuration management system;
receive a query from a user, wherein the query comprises a requested document version, and a requested version of the section tag; and
construct a new document version dynamically on the fly, wherein the new document version is constructed based on merging content of the section tag into the requested document version.

8. The system as claimed in claim 7, further configured to generate one or more version IDs associated with the first and modified versions of each section tag.

9. The system as claimed in claim 7, further configured to generate a document version associated with the document based on the first and the modified versions associated with each section tag in the document.

10. The system as claimed in claim 7, further configured to extract a target version, from the first and the modified versions, of each section tag based on a request received from a user, wherein the target version is extracted based on a configuration management technique.

11. The system as claimed in claim 7, further configured to generate a tree for the section tag based on the first version and the modified versions associated with the section tag.

12. The system as claimed in claim 7, further configured to determine a difference between different versions associated with the section tag independent of the document.

* * * * *